United States Patent
Udd et al.

(10) Patent No.: US 12,240,539 B2
(45) Date of Patent: Mar. 4, 2025

(54) CONTROL DEVICE, METHOD, COMPUTER PROGRAM AND COMPUTER READABLE MEDIUM FOR ENABLING POWER STEERING OF A VEHICLE

(71) Applicant: Scania CV AB, Södertälje (SE)

(72) Inventors: Jonas Udd, Stockholm (SE); Joachim Hagström, Järna (SE)

(73) Assignee: Scania CV AB, Södertälje (SE)

( * ) Notice: Subject to any disclaimer, the term of this patent is extended or adjusted under 35 U.S.C. 154(b) by 93 days.

(21) Appl. No.: 18/020,280

(22) PCT Filed: Jul. 9, 2021

(86) PCT No.: PCT/SE2021/050708
§ 371 (c)(1),
(2) Date: Feb. 8, 2023

(87) PCT Pub. No.: WO2022/045941
PCT Pub. Date: Mar. 3, 2022

(65) Prior Publication Data
US 2023/0303160 A1   Sep. 28, 2023

(30) Foreign Application Priority Data
Aug. 27, 2020 (SE) .................... 2050991-5

(51) Int. Cl.
*B62D 5/06* (2006.01)
*B62D 5/30* (2006.01)
*B62D 15/02* (2006.01)

(52) U.S. Cl.
CPC .............. *B62D 5/063* (2013.01); *B62D 5/30* (2013.01); *B62D 15/021* (2013.01)

(58) Field of Classification Search
CPC .................................. B62D 5/063; B62D 5/30
See application file for complete search history.

(56) References Cited

U.S. PATENT DOCUMENTS

| | | | |
|---|---|---|---|
| 3,558,239 A | | 1/1971 | Shiber |
| 3,921,748 A | * | 11/1975 | Dunn .................. B62D 5/30 180/407 |

(Continued)

FOREIGN PATENT DOCUMENTS

| | | |
|---|---|---|
| DE | 102004055857 A1 | 6/2006 |
| DE | 102010042098 A1 | 4/2012 |

(Continued)

OTHER PUBLICATIONS

Scania CV AB, International Patent Application No. PCT/SE2021/050708, International Preliminary Report on Patentability, Feb. 28, 2023.

(Continued)

*Primary Examiner* — Long T Tran
(74) *Attorney, Agent, or Firm* — Moore & Van Allen PLLC; W. Kevin Ransom

(57) ABSTRACT

A control device and a method for enabling power steering of a vehicle in case of unintentional shutdown of a combustion engine of the vehicle are provided. The vehicle comprises, in addition to the combustion engine, a starter configured to crank the combustion engine and a hydraulic power steering system comprising a hydraulic pump configured to be driven by the combustion engine. The method comprises a step of, in response to an indication of need of power steering, activating the starter to crank the combustion engine so that the combustion engine drives the hydraulic pump. A computer program, a computer-readable medium and a vehicle are also provided.

20 Claims, 3 Drawing Sheets

(56) References Cited

U.S. PATENT DOCUMENTS

| | | | | |
|---|---|---|---|---|
| 4,410,057 A | * | 10/1983 | Johnson | B62D 5/32 |
| | | | | 180/406 |
| 7,662,063 B2 | | 2/2010 | Schnitzer | |
| 10,024,291 B1 | * | 7/2018 | Khafagy | B60W 30/18018 |
| 10,113,476 B1 | * | 10/2018 | Fulton | F02N 11/0822 |
| 2009/0298646 A1 | * | 12/2009 | Parsons | F16D 41/07 |
| | | | | 474/171 |
| 2012/0330529 A1 | | 12/2012 | Pebley et al. | |
| 2014/0163823 A1 | | 6/2014 | Kim | |
| 2015/0361910 A1 | | 12/2015 | Ko | |
| 2016/0146128 A1 | * | 5/2016 | Tu | F02N 11/0829 |
| | | | | 701/113 |
| 2020/0062302 A1 | * | 2/2020 | Roos | B62D 5/30 |

FOREIGN PATENT DOCUMENTS

| | | |
|---|---|---|
| DE | 102015014882 A1 | 6/2016 |
| JP | 04110664 U | 9/1992 |
| WO | 2018194500 A1 | 10/2018 |

OTHER PUBLICATIONS

Scania CV AB, International Patent Application No. PCT/SE2021/050708, International Search Report, Sep. 2, 2021.
Scania CV AB, International Patent Application No. PCT/SE2021/050708, Written Opinion, Sep. 2, 2021.
Scania CV AB, Swedish Patent Application No. 2050991-5, Office Action, Feb. 26, 2021.
Scania CV AB, German Patent Application No. 112021003396.4, Office Action, Dec. 10, 2024.

* cited by examiner

CONTROL DEVICE, METHOD, COMPUTER PROGRAM AND COMPUTER READABLE MEDIUM FOR ENABLING POWER STEERING OF A VEHICLE

CROSS-REFERENCE TO RELATED APPLICATIONS

This application is a National Stage patent application (filed under 35 § U.S.C. 371) of PCT/SE2021/050708, filed Jul. 9, 2021, of the same title, which, in turn claims priority to Swedish Patent Application No. 2050991-5 filed Aug. 27, 2020, of the same title; the contents of each of which are hereby incorporated by reference.

FIELD OF THE INVENTION

The present disclosure relates in general to a method for enabling power steering of a vehicle in case of unintentional shutdown of a combustion engine of the vehicle. The present disclosure further relates in general to a control device configured to enable power steering of a vehicle in case of unintentional shutdown of a combustion engine of the vehicle. Moreover, the present disclosure relates in general to a computer program and a computer-readable medium. The present disclosure further relates in general to a vehicle.

BACKGROUND OF THE INVENTION

Power steering of a vehicle, such as a heavy vehicle, may be achieved by means of a hydraulic power steering system and/or an electric power steering system. A conventional hydraulic power steering system comprises a pump configured to pump hydraulic fluid in the system. The pump is generally driven by the combustion engine, although systems wherein the pump is driven by an electrical machine are also known. In case of the pump being driven by the combustion engine, the speed of the pump is dependent of the rotational speed of the combustion engine. This also means that when the combustion engine is in a non-rotating state, for example due to an unintentional shutdown of the combustion engine, the hydraulic pump is not able to pump any hydraulic fluid in the hydraulic power steering system. This in turn leads to a loss of power steering assistance. A combustion engine may be unintentionally shutdown for example due to lack of fuel or due to a failure. This may present a considerable safety issue when the vehicle is in motion because there might be significant difficulties in the steering of vehicle.

In case the vehicle comprises both an electric power steering system and a hydraulic power steering system, the electric power steering system may in some situations to some extent compensate for the loss of power steering assistance resulting from an unintentional shutdown of the combustion engine. However, an electric power steering system may generally provide less power steering capability than hydraulic power steering systems.

DE102010042098A1 discloses a method for operating a powertrain of a motor car. In accordance with the method, the rotational speed of the engine is monitored when traction force is interrupted, and a starter is activated when the rotational speed of the engine falls below a threshold value. Thereby, at least partial steering assistance can be provided.

SUMMARY OF THE INVENTION

The object of the present invention is to improve the ability to steer a vehicle in case of unintentional shutdown of the combustion engine.

The object is achieved by the subject-matter of the appended independent claim(s).

In accordance with the present disclosure, a method for enabling power steering of a vehicle in case of unintentional shutdown of a combustion engine of the vehicle is provided. The method is performed by a control device. The vehicle comprises the combustion engine and a starter configured to crank the combustion engine. The vehicle further comprises a hydraulic power steering system comprising a hydraulic pump configured to be driven by the combustion engine. The method comprises a step of, in response to an indication of need of power steering, activating the starter to crank the combustion engine so that the combustion engine drives the hydraulic pump.

By means of the present method, power steering is enabled by the hydraulic power steering system even when the combustion engine unintentionally is shutdown. In view of the hydraulic pump of the hydraulic power steering system being configured to be driven by the combustion engine, a shutdown of the combustion engine automatically results in the hydraulic pump not being driven and therefore a loss of power steering assistance. Moreover, in case the combustion engine is unintentionally shutdown, it is generally important to as soon as possible safely stop the vehicle at a suitable place. This also means that it is especially important to be able to steer the vehicle in a safe manner to a safe stop, which often requires power steering assistance. Thus, by utilizing the starter to crank the combustion engine in accordance with the present method, the hydraulic pump will also be driven and therefore power steering of the vehicle is enabled. This in turn increases the safety in the operation of the vehicle. Furthermore, the vehicle need not comprise other means for power steering in addition to the hydraulic power steering system, such as an electrical power steering system, if not desired. Moreover, in view of the fact that the starter is activated in response to an indication of need of power steering, the load on the starter can be minimized. This in turn reduces the risk for damage of the starter, which for example could lead to a failure of the starter and risk of need for a subsequent replacement of the starter.

The method may further comprise a step of determining said indication of need of power steering based on a detection of at least one parameter selected from the group comprising steering angle, steering angle velocity, steering input torque, difference in angle of steered wheels, brake pedal position, and/or rate of change of brake pedal position. Thereby, an indication of need of power steering can reliably be determined. This in turn ensures that the starter may be activated at a suitable point in time to enable power steering when it may be needed.

The step of activating the starter may be performed in response to a determination that the vehicle travelling speed is below a preselected vehicle speed limit. Thereby, it can be avoided that the starter is activated in situations where the vehicle has a travelling speed sufficiently high to enable safe steering ability of the vehicle.

The step of activating the starter may further be made in response to a determination that the combustion engine is disconnected from any drive wheel of the vehicle. Thereby, an activation of the starter when the combustion engine has a sufficient rotational speed for driving the hydraulic pump, as a result of the combustion engine being dragged by the drive wheels of the vehicle, can be avoided. This in turn reduces the risk of unnecessary usage of the starter.

The vehicle may comprise a non-synchronized gearbox, said gearbox configured to selectively transfer driving torque from the combustion engine to drive wheels of the vehicle. The present method is particularly suitable for a vehicle comprising a non-synchronized gearbox. This is because it may be very difficult to connect the combustion engine to the drive wheels when the combustion engine cannot be used for synchronizing gears to be engaged as a result of the unintentional shutdown. There is a high risk for damage of the gearbox in case of seeking to engage gears which do not have essentially the same rotational speed. Therefore, for such vehicles, connecting the combustion engine to the drive wheels in order to drag the combustion engine so that it may drive the hydraulic pump may not be possible.

The method may further comprise a step of determining an unintentional shutdown of the combustion engine based on a rotational speed of the combustion engine being below a threshold rotational speed while the vehicle is travelling. Thereby, the unintentional shutdown of the combustion engine can easily and accurately be determined. This is turn may avoids a potential risk of activating the starter, for the purpose of enabling power steering, in cases where it is not needed.

The present disclosure further relates to a computer program comprising instructions which, when executed by a control device, cause the control device to carry out the method as described above.

The present disclosure further relates to a computer-readable medium comprising instructions which, when executed by a control device, cause the control device to carry out the method as described above.

Moreover, in accordance with the present disclosure, a control device configured to enable power steering of a vehicle in case of unintentional shutdown of a combustion engine of the vehicle is provided. The vehicle comprises the combustion engine, a starter configured to crank the combustion engine, and a hydraulic power steering system comprising a hydraulic pump configured to be driven by the combustion engine. The control device is configured to, in response to an indication of need of power steering, activate the starter to crank the combustion engine so that the combustion engine drives the hydraulic pump.

The control device provides at least the same advantages as described above with regard to the corresponding method for enabling power steering of a vehicle in case of unintentional shutdown of a combustion engine of the vehicle.

The control device may be configured to determine said indication of need of power assistance based on at least one detected parameter selected from the group comprising steering angle, steering angle velocity, steering input torque, difference in angle of steered wheels, brake pedal position, and/or rate of change of brake pedal position.

The control device may be configured to perform said activation of the starter in response to a determination that the vehicle travelling speed is below a preselected vehicle speed limit.

The control device may be configured to perform said activation of the starter in response to a determination that the combustion engine is disconnected from any drive wheel of the vehicle.

The vehicle may comprise a non-synchronized gearbox, said gearbox configured to selectively transfer driving torque from the combustion engine to drive wheels of the vehicle.

The control device may further be configured to determine an unintentional shutdown of the combustion engine based on rotational speed of the combustion engine being below a threshold rotational speed while the vehicle is travelling.

The present disclosure further relates to a vehicle comprising the control device as described above.

DETAILED DESCRIPTION

Figure 1:
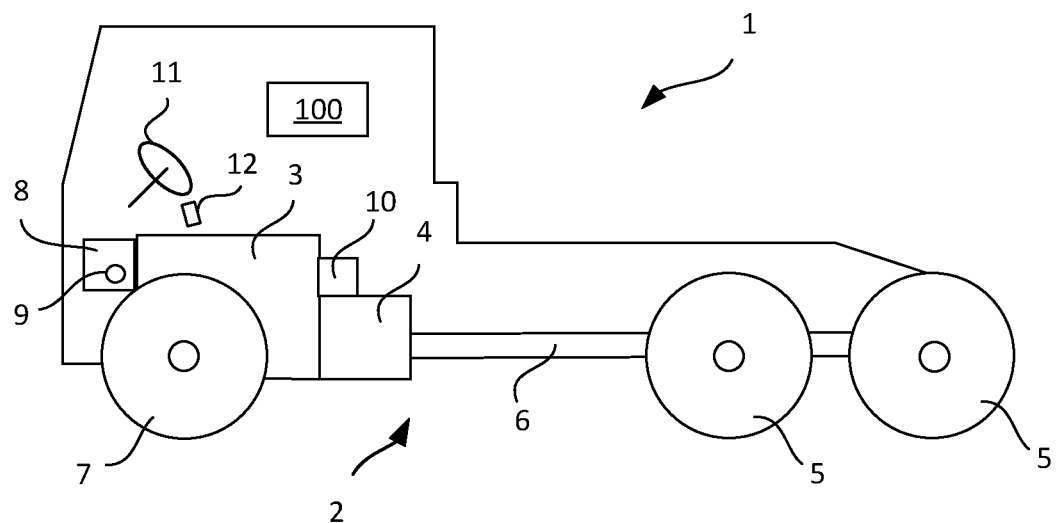
FIG. 1 schematically illustrates a side view of an example of a vehicle.

The invention will be described in more detail below with reference to exemplifying embodiments and the accompanying drawings. The invention is however not limited to the exemplifying embodiments discussed and/or shown in the drawings, but may be varied within the scope of the appended independent claim(s). Furthermore, the drawings shall not be considered drawn to scale as some features may be exaggerated in order to more clearly illustrate the invention or features thereof.

In accordance with the present disclosure, a method for enabling power steering of a vehicle in case of unintentional shutdown of a combustion engine of the vehicle is provided. More specifically, the present disclosure provides a method for enabling power steering of a vehicle in case of unintentional shutdown of the combustion engine of the vehicle in situations where the combustion engine is disconnected from the drive wheels of the vehicle. The combustion engine may be disconnected from the drive wheels of the vehicle for example by a clutch, connecting the combustion engine with a gearbox, being in an open state. The combustion engine may also be disconnected from the drive wheels in case of a gearbox being in a neutral state. Moreover, the method is intended to be performed in situations where the vehicle is in motion. That is, the method may be performed in situations when the vehicle is travelling. The method for enabling power steering in accordance with the present disclosure may be performed when the combustion engine unintentionally is in a shutdown state, i.e. is in a non-rotating state, or is expected to unintentionally be in shutdown state in the very near future. In the latter case, an unintentional shut down process of the combustion engine may typically have been initiated, but the combustion engine has not yet reached a non-rotating state and thus has a rotational speed.

In addition to the combustion engine, the vehicle in which the present method may be performed comprises a starter configured to crank the combustion engine, and a hydraulic power steering system comprising a hydraulic pump configured to be driven by the combustion engine. The method for enabling power steering of a vehicle in case of unintentional shutdown of the combustion engine comprises a step of activating the starter to crank the combustion engine so that the combustion engine drives the hydraulic pump. In other words, the starter is activated to crank the combustion engine to a rotational speed of the combustion engine sufficient for the hydraulic pump to pump hydraulic fluid in the hydraulic power steering system such that power steering is provided. By way of example only, the starter may be configured to crank the combustion engine to a rotational speed of about 200 rpm. It should however be noted that a rotational speed of the combustion engine sufficient for achieving power steering may be dependent on the configuration of the hydraulic power steering system and the vehicle. A suitable rotational speed of the combustion engine for a specific vehicle configuration (including configuration of the hydraulic power steering system) for this purpose may however be determined by a person skilled in the art by conventional testing methods.

Said step of activating the starter is performed in response to an indication of need of power steering. When used in the present disclosure, the term "indication of need of power steering" is considered to mean that there is some indication that there might be a need of power steering, but not necessarily that there is an actual need thereof. In other words, in accordance with the present method, it does not have to be conclusively determined that there is an actual need for power steering (although this may naturally also be performed) but rather that a detection is made of a parameter indicating that there might be, right now or in the very near future, a desire of power steering of the vehicle. In other words, "indication of need of power steering" should in the present disclosure be interpreted as an assumed, and/or expected, need of power steering.

An unintentional shutdown of the combustion engine is in the present disclosure considered to mean an undesired shutdown of the combustion engine. An unintentional shutdown of the combustion engine is neither initiated by a driver of the vehicle nor by any control system associated with the vehicle for the purpose of driving the vehicle, except possibly in case of emergency situations. An unintentional shutdown of the combustion engine is thus not considered to encompass situations where the combustion engine is purposively shut down, for example for a coasting with engine off operation of the vehicle (also known as gliding). One example of a situation where an unintentional shutdown of the combustion engine may occur may be due to the vehicle running out of fuel. Another example of an unintentional shutdown of the combustion engine may be due to failure of the combustion engine or failure in a combustion engine control system.

In case there is no determination of an indication of need of power steering in situations where the combustion engine shuts down unintentionally, the starter may remain in a deactivated state. In such a deactivated state, the starter will not crank the combustion engine. By means of utilizing the starter to crank the combustion engine only in situations where there is an indication of need of power steering, the load on the starter can be minimized. This in turn reduces the risk of damage of the starter.

As mentioned above, in accordance with the present method the starter is activated in response to an indication of need of power steering. The method may comprise a step of determining an indication of need of power steering based on a detection of at least one parameter, as will be exemplified below, in comparison with a predefined threshold value for said parameter. Such predefined threshold values may for example be stored in suitable database therefore in a way that they may be retrieved by the control device when desired. Moreover, such threshold values may be dependent of various factors, such as vehicle configuration, vehicle load and vehicle speed.

The indication of need of power steering may comprise an indication that the vehicle is currently turning. This may for example be identified by a difference in angle of the steered wheels of the vehicle. Thus, the method may comprise a step of determining said indication of need of power steering based on a detection of a difference in angle between the steered wheels of the vehicle.

Alternatively, the indication of need of power steering may comprise an indication that a driver, or steering control system of the vehicle, intends to turn the vehicle. This may for example be identified by the steering angle and/or steering angle velocity (i.e. the rate at which the steering angle changes). This may alternatively be identified by the steering input torque. The method may thus comprise a step of determining the indication of need of power steering based on a detection of steering angle, steering angle velocity and/or steering input torque.

Alternatively, or additionally, the indication of need of power steering may comprise an indication that a driver is braking, or at least trying to brake, the vehicle in a sudden way. For example, the indication of need of power steering may comprise an indication that the driver is seeking to brake the vehicle by means of the wheel brakes of the vehicle in a situation where a control system of the vehicle would not expect the wheel brakes to be utilized. The method may thus comprise a step of determining the indication of need of power steering based on a detection of a brake pedal position and/or rate of change of brake pedal position.

Means for detecting and determining the above discussed parameters are previously known to a person skilled in the art and will thus not be discussed in detail in the present disclosure. By way of example only, detection of steering angle may be made by a conventional steering angle sensor.

The ability to steer a vehicle is dependent of the travelling speed of the vehicle, and the actual need of power steering may therefore depend on said travelling speed. At higher vehicle travelling speeds, it is generally easier to steer the vehicle compared to the steering ability at lower vehicle travelling speeds. The method may therefore also comprise a step of determining whether the travelling speed of the vehicle is below a preselected vehicle speed limit. The travelling speed may be determined by any previously known method therefore. Said preselected vehicle speed limit may correspond to a threshold above which it may be expected that there is no actual need of power steering. It should here be noted that the preselected vehicle speed limit is dependent of vehicle configuration, and may be dependent of other factors such as vehicle load etc. In case the travelling speed of the vehicle is above the preselected vehicle speed limit, the starter need not be activated. However, in case the vehicle travelling speed is below the preselected vehicle speed limit, there is a possibility that there might be a need of power steering. In the herein described method, the step of activating the starter may thus be made in response to a determination that the vehicle travelling speed is below the preselected vehicle speed limit.

In situations where the combustion engine is dragged as a result of being connected to the drive wheels while the vehicle is travelling, the rotational speed of the combustion engine may be sufficient to drive the hydraulic pump of the hydraulic power steering system. In such situations, it is therefore not necessary to activate the starter. In the method according to the present disclosure, the step of activating the starter may thus be performed in response also to a determination that the combustion engine is disconnected from any drive wheel of the vehicle.

However, when the rotational speed of the combustion engine reaches a too low value to drive the hydraulic pump (as a result of the vehicle slowing down) there is still a likelihood that power steering is still needed. For said reason, the method may comprise a step of, in response to a determination that the rotational speed of the combustion engine is below a rotational speed limit, disconnecting the combustion engine from the drive wheels of the vehicle. Thereafter, the starter may be utilized to crank the combustion engine, and the step of activating the starter may thus be performed in response to a determination that the combustion engine is disconnected from any drive wheel of the vehicle or in response to a determination that a step of disconnecting the combustion engine from the drive wheels (for example by opening a clutch or putting the gearbox in neutral) has been performed.

The present method for enabling power steering of a vehicle in case of unintentional shutdown of the combustion engine of the vehicle is particularly suitable for vehicles comprising a non-synchronized gearbox. In the present disclosure, a non-synchronized gearbox is intended to mean a gearbox comprising at least one gearbox unit which comprises non-synchronized gears. In a non-synchronized gearbox, the combustion engine and/or transmission brakes associated with the gearbox are utilized for the purpose of synchronizing the rotational speed of the constituent components to be engaged during a gearshift. This means that, in case the combustion engine is disconnected from the drive wheels as a result of the gearbox being in neutral when the combustion engine is unintentionally shut down, it may not be possible to engage a gear in the gearbox. Therefore, it may not be possible to achieve a state in which the combustion engine may be dragged by the drive wheels.

It should however be noted that the present method may also be performed in cases where the vehicle comprises a synchronized gearbox. For example, the method described herein can be performed also for a vehicle comprising a synchronized gearbox in situations where it for some reason is not desired to shift the gearbox from neutral to an engaged gear in case of unintentional shutdown of the combustion engine.

In case the vehicle comprises a synchronized gearbox, the method may comprise a step of, in case of unintentional shutdown of the combustion engine, determining whether the combustion engine may be connected to the drive wheels of the vehicle, if not already connected. If it is determined that the combustion engine may be connected to the drive wheels of the vehicle, the method may comprise a step of connecting the combustion engine to the drive wheels and inhibit activation of the starter. Thereby, the hydraulic pump may be driven by the combustion engine as a result of the combustion engine being dragged by the drive wheels and utilization of the starter for dragging the combustion engine may be avoided.

The method may also comprise a step of determining an unintentional shutdown of the combustion engine. Said step of determining an unintentional shutdown of the combustion engine may include determining that the combustion engine is in a shut down state, i.e. in a non-rotating state. Alternatively, said step of determining an unintentional shutdown of the combustion engine may include determining that the combustion engine is about to shut down unintentionally. The latter may be determined in case it is detected that the rotational speed of the combustion engine falls below a rotational speed at which it may be expected that the combustion engine will soon come to a stop. Such a rotational speed is dependent of the configuration of the combustion engine, but is lower than an idle rotational speed of the combustion engine. The rotational speed of the combustion engine may be determined by any previously known method therefore.

The method for enabling power steering of a vehicle may thus comprise a step of determining an unintentional shutdown of the combustion engine based on a rotational speed of the combustion engine being below a threshold rotational speed while the vehicle is travelling (i.e. while the vehicle is in motion). Said threshold rotational speed may be a rotational speed at which it may be expected that the combustion engine will come to a non-rotating state in the near future.

It should be noted that in a situation of an unintentional shutdown of the combustion engine, it is generally desired to bring the vehicle to a stop at a safe place by the road. In other words, there is generally no desire to continue driving the vehicle longer than necessary. Vehicles today generally comprises some type of means for generating a warning message to a driver of the vehicle in case of unintentional shutdown of the combustion engine. It may therefore be expected that the vehicle will be brought to a stop within a short period of time, for example less than half a minute. During such a short period of time, it may be acceptable to use the starter to crank the combustion engine. The starter may be deactivated as soon as there is no need for power steering assistance. More specifically, the starter may be deactivated as soon as the vehicle is stationary.

Furthermore, in accordance with the present disclosure, a control device configured to enable power steering of a vehicle in case of unintentional shutdown of a combustion engine of the vehicle is provided. The vehicle comprises, in addition to the combustion engine, a starter configured to crank the combustion engine and a hydraulic power steering system. The hydraulic power steering system comprises a hydraulic pump configured to be driven by the combustion engine. The control device is configured to, in response to an indication of need of power steering, active the starter to crank the combustion engine and thereby drive the hydraulic pump by means of the combustion engine.

The control device may further be configured to determine an indication of need of power assistance. For example, the control device may be configured to determine said indication of need of power assistance based on at least one detected parameter selected from the group comprising steering angle, steering angle velocity, steering input torque, difference in angle of steered wheels, brake pedal position, and/or rate of change of brake pedal position. For said purpose, the control device may be configured to monitor any one of (or all of) the above exemplified parameters by means of various sensors configured to measure or otherwise determine said parameters. Such sensors are previously known in the art and will therefore not be described in further detail in the present disclosure.

The control device may further be configured to determine whether the current vehicle travelling speed is below a preselected vehicle speed limit. If determined that the vehicle travelling speed is below said preselected vehicle speed limit, the control device may be configured to perform said activation of the starter.

The control device may further be configured to determine whether the combustion engine is disconnected from the drive wheels of the vehicle, and perform said activation of the starter only in case of a determination that the combustion engine is disconnected from the drive wheels. In case it is determined that the combustion engine is connected to the drive wheels of the vehicle, the control device may further be configured to disconnect the combustion engine from the drive wheels of the vehicle in response to a determination that the rotational speed of the combustion engine is below a rotational speed limit at which the combustion engine may drive the hydraulic pump and thereafter perform said activation of the starter.

The control device may be configured to perform any one of the steps of the method for enabling power steering of a vehicle in case of unintentional shutdown of a combustion engine of the vehicle as described herein.

The control device may comprise one or more control units. In case the control device comprises a plurality of control units, each control unit may be configured to control a certain function or a certain function may be divided between different control units. The control device may be arranged in the vehicle, and thus be a part of the vehicle. Alternatively, one or more control units of the control device may be arranged remote from the vehicle, for example at a remote control center, and configured to communicate with one or more control units of the vehicle for the purpose of performing the herein described method. Such a communication may be performed by any conventional communication systems, such as a vehicle-to-anything (V2X) communication system.

The performance of the method for enabling power steering of a vehicle in case of unintentional shutdown of a combustion engine of the vehicle as disclosed herein may be governed by programmed instructions. These programmed instructions typically take the form of a computer program which, when executed in or by a control device, causes the control device to effect desired forms of control action. Such instructions may typically be stored on a computer-readable medium.

FIG. 1 schematically illustrates a side view of an example of a vehicle 1. The vehicle comprises a powertrain 2 including a combustion engine 3. The powertrain 3 further comprises a gearbox 4 configured to transmit driving torque, at different gear ratios, from the combustion engine 2 to drive wheels 5. A clutch (not shown) may be arranged between the combustion engine 3 and the gearbox 4. The gearbox 4 may be connected to the drive wheels via a propeller shaft 6. The vehicle 1 further comprises a starter 10 capable of cranking the combustion engine 8. The starter 10 may be utilized to start the combustion engine 3 in conjunction with start of the vehicle.

The gearbox 4 may for example be an automated manual transmission (AMT), but is not limited thereto. The gearbox 4 may be a non-synchronized gearbox. In a non-synchronized gearbox, a dog clutch may be used to lock the intended gearwheel to the corresponding transmission shaft during a gearshift, and the combustion engine and one or more transmission brakes may be used for the purpose of synchronizing the rotational speed of the gearwheel and transmission shaft before engagement of the dog clutch. In contrast, in a synchronized gearbox, a coupling device such as a synchromesh is used for at least a part of the synchronization of the rotational speed of the gearwheel and transmission shaft to be engaged. In the present disclosure, a non-synchronized gearbox is intended to mean a gearbox comprising at least one gearbox unit which comprises non-synchronized gears.

The vehicle further comprises front wheels 7, which may be steered wheels. The drive wheels 5, which may be rear wheels of the vehicle, may be steered wheels or non-steered wheels.

The vehicle 1 further comprises a hydraulic power steering system 8 configured to provide power steering of the steered wheels of the vehicle when desired. The hydraulic power steering system 8 comprises a hydraulic pump 9 configured to be driven by the combustion engine 3. When active, the hydraulic pump 8 may be configured to supply pressurized hydraulic fluid to a steering cylinder (not shown) of the hydraulic power steering system.

The vehicle 1 may further comprise a steering wheel 11. The steering wheel 11 may be operated by a driver of the vehicle 1 for the purpose of steering the vehicle. The vehicle 1 may further comprise a brake pedal 12. The brake pedal 12 may be configured to be operated by a driver of the vehicle for the purpose of braking the vehicle 1. The vehicle may further comprise various sensors (not shown) configured to detect various parameters of the vehicle during operation of the vehicle.

The vehicle 1 may further comprise a control device 100 configured to enable power steering of the vehicle in case of unintentional shutdown of the combustion engine 3.

The vehicle 1 may be a heavy vehicle, such as a truck or a bus. Furthermore, the vehicle may be a hybrid vehicle, in which case the vehicle further comprises an electric machine (not shown) in addition to the combustion engine 2. Moreover, the vehicle 1 may be a manually driven vehicle, a partly autonomous vehicle, or a fully autonomous vehicle.

It should be noted that the vehicle 1 shown in FIG. 1 is merely for illustrative purposes, and the present invention is not limited to the vehicle 1 shown.

Figure 2:
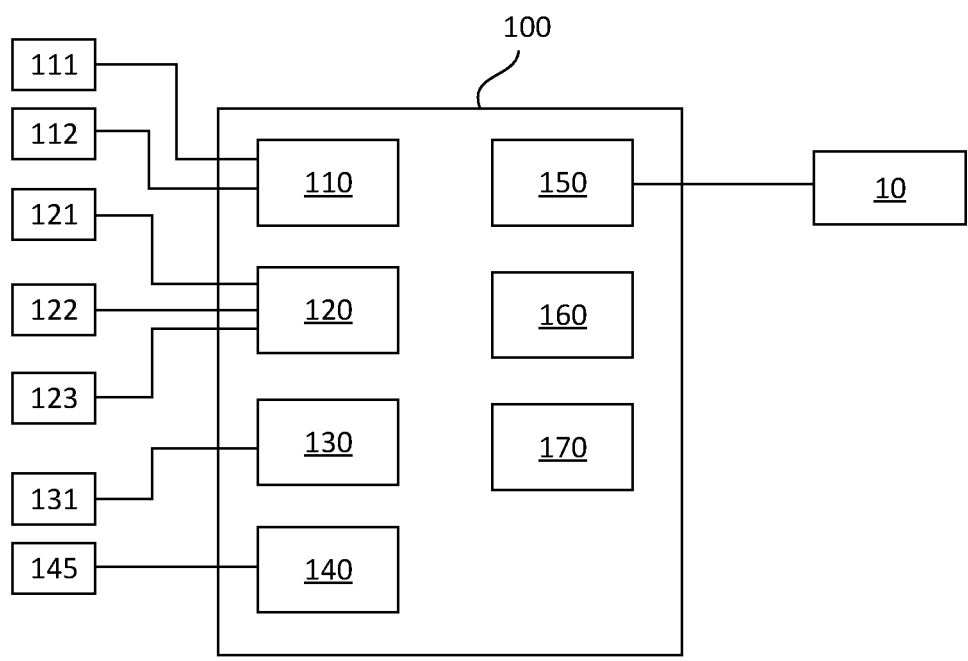
FIG. 2 schematically illustrates one exemplifying embodiment of a control device configured to enable power steering of a vehicle in accordance with the present disclosure.

FIG. 2 schematically illustrates one exemplifying embodiment of a control device 100 configured to enable power steering of a vehicle in case of unintentional shutdown of the combustion engine. The control device 100 may be comprised in a vehicle, such as the vehicle shown in FIG. 1. Alternatively, parts of the control device may be comprised in the vehicle and parts of the control device may be arranged remote from the vehicle, such as at a remote control center. According to yet an alternative, the whole control device 100 is arranged remotely from the vehicle.

The control device 100 may comprise a first control unit 110 configured to determine an unintentional shutdown of the combustion engine of a vehicle. The first control unit 110 may be configured to communicate with rotational speed sensor 111 configured to detect the rotational speed of the combustion engine. The first control unit 110 may thus request and receive data from the rotational speed sensor 111 for the purpose of monitoring the rotational speed of the combustion engine. Alternatively, the first control unit 110 may be configured to communicate with a combustion engine management system 112 for the purpose of determining unintentional shutdown of the combustion engine. The first control unit 110 may be configured to communicate with at least the fifth control unit 150 described below.

The control device 100 may comprise a second control unit 120 configured to determine an indication of need of power steering. The second control unit 120 may be configured to receive information from various sensors configured to detect operating parameters of the vehicle, such as a steering angle sensor 121, a steering input torque sensor, or a brake pedal position sensor 123. The second control unit 120 may be configured to request and receive information from such sensors when an unintentional shutdown of the combustion engine has been determined. The second control unit 120 may further be configured to communicate with at least the fifth control unit 150 as described below.

The control device 100 may further comprise a third control unit 130 configured to determine that the vehicle travelling speed is below a preselected vehicle speed limit. For said purpose, the third control unit 130 may be configured to communicate with a speed sensor 131 configured to determine the travelling speed of the vehicle. The third control unit 130 may further be configured to communicate with at least the fifth control unit 150 as described below.

The control device 100 may further comprise a fourth control unit 140 configured to determine that the combustion engine is disconnected from the drive wheels of the vehicle. The fourth control unit 140 may for this purpose be configured to communicate with a powertrain management system 145. The powertrain management system 145 may for example comprise a gearbox management system and a clutch management system. The fourth control unit 140 may further be configured to communicate with at least the fifth control unit 150 as described below.

The control device 100 may further comprise a fifth control unit 150 configured to activate and control a starter of the vehicle in response to control signals from the other control units of the control device 100. The fifth control unit 150 is configured to communicate with the starter 10 of the vehicle. More specifically, the fifth control unit 150 may be configured to activate the starter, in case of unintentional shutdown of the combustion engine, and in response to an indication of need of power steering. The fifth control unit 150 may further be configured to inhibit activation of the starter 10 in response to a control signal from the third control unit 130 that the vehicle travelling speed is not below the preselected vehicle speed limit. The fifth control unit 150 may further be configured to inhibit activation of the starter 10 in response to a control signal from the fourth control unit 140 that the combustion engine connected to a drive wheel of the vehicle.

The control device 100 may further comprise a sixth control unit 160 configured to generate a warning signal to be communicated to a driver and/or to a remote control center. The sixth control unit 160 may for example be configured to generate the warning signal in response to a control signal from the fifth control unit 150 informing that the starter is activated or is to be activated within short.

The control device 100 may also comprise a seventh control unit 170 configured to communicate with one or more control systems of the vehicle and/or a remote control center. The seventh control unit 170 may be configured to communicate by any previously known means therefore, for example via a CAN bus, a V2C communication system or the like. The seventh control unit 170 may for example be configured to request and receive data (for example relating to vehicle configuration, preselected vehicle speed limit etc.) from a database (if not already available to the control device) or communicate a warning signal as generated by the sixth control unit 160.

Figure 3:
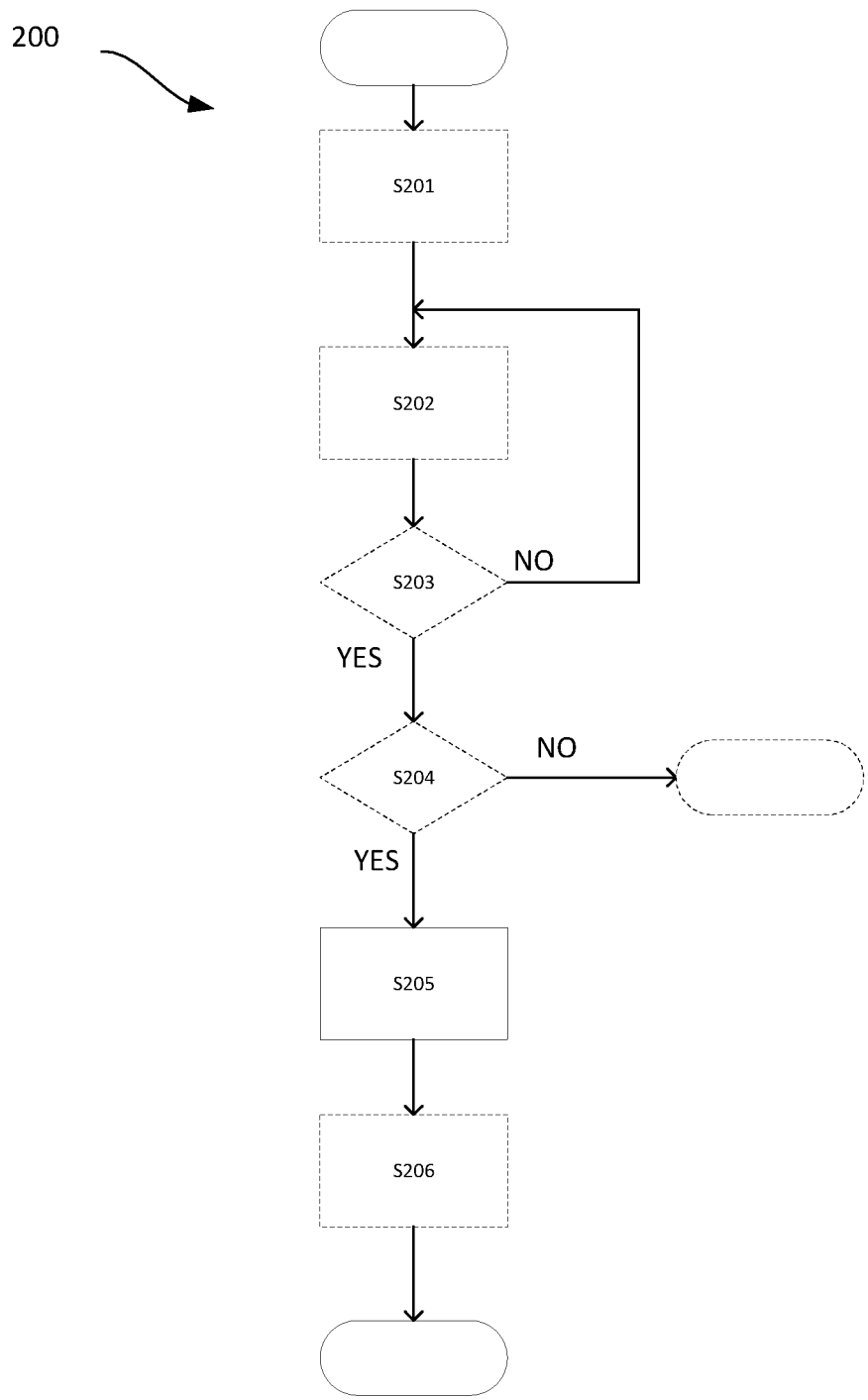
FIG. 3 represents a flowchart schematically illustrating a method for enabling power steering of a vehicle according to an exemplifying embodiment of the present disclosure, and FIG. 4 schematically illustrates a device that may constitute, comprise or be a part of a control device configured to enable power steering of a vehicle.

FIG. 3 represents a flowchart schematically illustrating one exemplifying embodiment of the method 200 for enabling power steering of a vehicle in case of unintentional shutdown of a combustion engine of the vehicle according to the present disclosure. The method is performed by a control device configured therefore.

The method 200 may comprise a first step of determining S201 an unintentional shutdown of the combustion engine. The step S201 may for example comprise detecting, while the vehicle is travelling, that the combustion engine is in a non-rotating state, or that the rotational speed of the combustion engine falls below a threshold rotational speed. Such threshold rotational speed may correspond to a rotational speed at which the combustion engine may be expected to soon be in a non-rotating state. Alternatively, a detection of unintentional shutdown of the combustion engine has already been concluded by some other controller in the performance of any other form of control of the vehicle, and thus need not be a part of the method 200 per se.

The method may further comprise a step of determining S202 an indication of need of power steering. The step S202 may comprise determining an indication of need of power steering based on detection of a parameter that the vehicle is currently turning, or that a driver or a control system (such as a steering control system) is seeking to turn the vehicle. For example, step S202 may comprise determining said indication of need of power steering based on a detection of a parameter selected from the group comprising steering angle, steering angle velocity, steering input torque, difference in angle of steered wheels, brake pedal position, and/or rate of change of brake pedal position.

The method may further comprise a step of determining S203 if the vehicle travelling speed is below a preselected vehicle speed limit. The preselected vehicle speed limit may correspond to a vehicle travelling speed above which it may be expected that there is no, or only very little, actual need for power steering. In case the vehicle travelling speed is not below the preselected vehicle speed limit, the method may be reverted back to prior to the possible step S202 such that step S202 may be repeated. However, in case the vehicle travelling speed is below the preselected vehicle speed limit, the method may proceed to a subsequent step.

The method may further comprise a step of determining S204 that the combustion engine is disconnected from the drive wheels of the vehicle. In case the combustion engine is connected to the drive wheels, it is likely that the combustion engine is dragged by the drive wheels and that the hydraulic pump therefore may be driven by the drive wheels. In such a case, the method may be ended, as shown in the figure. Alternatively, the method may proceed to a step (not shown) of determining whether or not the rotational speed of the combustion engine is sufficient to drive the hydraulic pump, and if not, disconnecting the combustion engine from the drive wheels and thereafter revert back to any preceding step of the method. However, in case it is determined in step S204 that the combustion engine is disconnected from the drive wheels of the vehicle, the method may proceed to the subsequent step S205.

The method comprises a step of activating S205 the starter to crank the combustion engine. The combustion engine will thus achieve a rotational speed as a result of being cranked by the starter. Thereby, the combustion engine drives the hydraulic pump since the hydraulic pump is powered by the combustion engine. The hydraulic pump will therefore be activated. The step S205 is performed in response to an indication of need of power steering. Said indication of need of power steering may be derived from the above described step S202.

The method may further comprise a step of generating S206 a warning signal to inform a driver of the vehicle and/or to a remote control center. Said warning signal may comprise information that the starter is used for cranking the combustion engine in a situation of unintentional shutdown of the combustion engine. Such a warning signal may for example be used for the purpose of ensuring that the vehicle is brought to a stop as soon as possible. Alternatively, or additionally, said warning signal may serve the purpose of providing a recommendation to (at a later stage) check the condition of the starter, for example at a workshop or the like, to ensure that the starter has not been damaged as a result of its use to crank the combustion engine for the purpose of enabling power steering of the vehicle.

Figure 4:
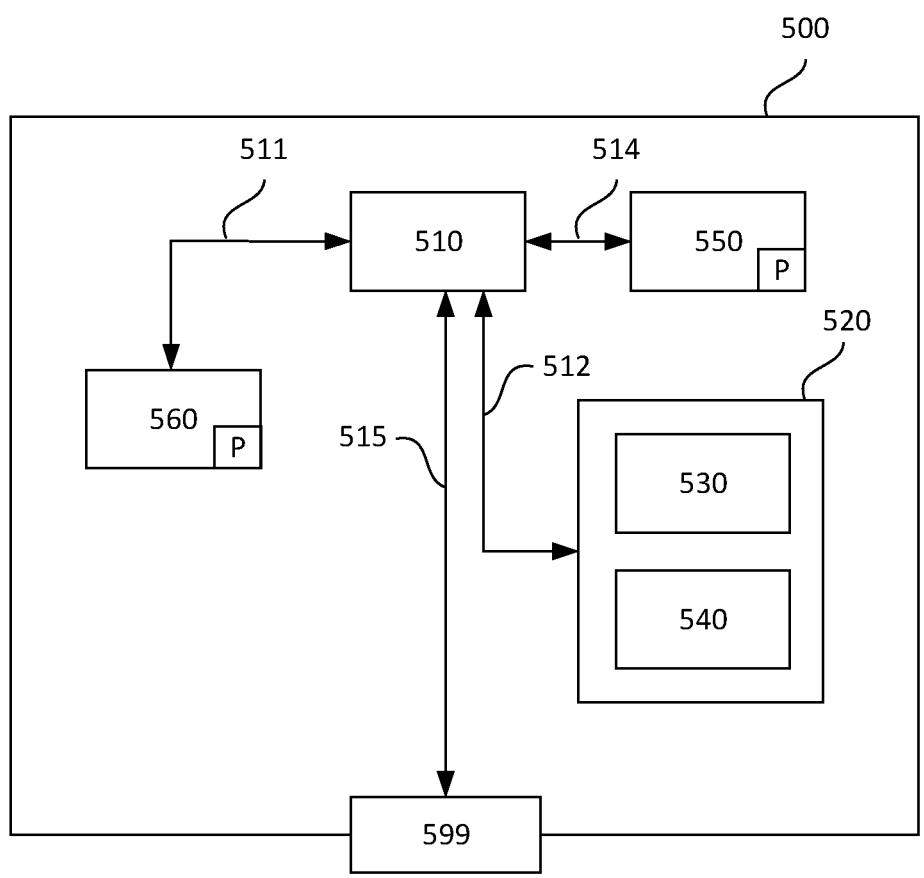

FIG. 4 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for enabling power steering of a vehicle in case of unintentional shutdown of a combustion engine of the vehicle. The vehicle comprises the combustion engine, a starter configured to crank the combustion engine, and a hydraulic power steering system comprising a hydraulic pump configured to be driven by the combustion engine. The computer program comprises instructions for, in response to an indication of need of power steering, activating the starter to crank the combustion engine so that the combustion engine drives the hydraulic pump.

The program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The invention claimed is:

1. A method for enabling power steering of a vehicle in case of unintentional shutdown of a combustion engine of the vehicle,
the method performed by a control device,
the vehicle comprising:
   the combustion engine,
   a starter configured to crank the combustion engine, and
   a hydraulic power steering system comprising a hydraulic pump configured to be driven by the combustion engine;
the method comprising a step of:
   in response to an indication of need of power steering, activating the starter to crank the combustion engine so that the combustion engine drives the hydraulic pump.

2. The method according to claim 1, further comprising a step of determining said indication of need of power steering based on a detection of at least one parameter selected from the group comprising steering angle, steering angle velocity, steering input torque, difference in angle of steered wheels, brake pedal position, and/or rate of change of brake pedal position.

3. The method according to claim 1, wherein the step of activating the starter is performed in response to a determination that the vehicle travelling speed is below a preselected vehicle speed limit.

4. The method according to claim 1, wherein the step of activating the starter is made in response to a determination that the combustion engine is disconnected from any drive wheel of the vehicle.

5. The method according to claim 1, wherein the vehicle further comprises a non-synchronized gearbox, the gearbox configured to selectively transfer driving torque from the combustion engine to drive wheels of the vehicle.

6. The method according to claim 1, further comprising a step of determining an unintentional shutdown of the combustion engine based on a rotational speed of the combustion engine being below a threshold rotational speed while the vehicle is travelling.

7. A computer program product comprising computer program code stored on a non-transitory computer-readable medium, said computer program product configured for enabling power steering of a vehicle in case of unintentional shutdown of a combustion engine of the vehicle, the vehicle comprising: the combustion engine, a starter configured to crank the combustion engine, and a hydraulic power steering system comprising a hydraulic pump configured to be driven by the combustion engine, said computer program code comprising computer instructions to cause at least one control device to perform the following operation:
   in response to an indication of need of power steering, activating the starter to crank the combustion engine so that the combustion engine drives the hydraulic pump.

8. The computer program product of claim 7 further comprising computer instructions to cause at least one control device to perform the following operation: determining said indication of need of power steering based on a detection of at least one parameter selected from the group comprising steering angle, steering angle velocity, steering input torque, difference in angle of steered wheels, brake pedal position, and/or rate of change of brake pedal position.

9. The computer program product of claim 7 further comprising instructions to cause the at least one control device to perform the operation of activating the starter in response to a determination that the vehicle travelling speed is below a preselected vehicle speed limit.

10. The computer program product of claim 7 further comprising instructions to cause the at least one control device to perform the operation of activating the starter in response to a determination that the combustion engine is disconnected from any drive wheel of the vehicle.

11. The computer program product of claim 7, wherein the vehicle further comprises a non-synchronized gearbox, the gearbox configured to selectively transfer driving torque from the combustion engine to drive wheels of the vehicle.

12. A control device configured to enable power steering of a vehicle in case of unintentional shutdown of a combustion engine of the vehicle,
the vehicle comprising:
the combustion engine,
a starter configured to crank the combustion engine, and
a hydraulic power steering system comprising a hydraulic pump configured to be driven by the combustion engine;
wherein the control device is configured to, in response to an indication of need of power steering, activate the starter to crank the combustion engine so that the combustion engine drives the hydraulic pump.

13. The control device according to claim 12, further configured to determine said indication of need of power assistance based on at least one detected parameter selected from the group comprising steering angle, steering angle velocity, steering input torque, difference in angle of steered wheels, brake pedal position, and/or rate of change of brake pedal position.

14. The control device of claim 12, wherein the control device is configured to operate computer instructions of computer program code stored on a non-transitory computer-readable medium to thereby perform the operation of, in response to an indication of need of power steering, activating the starter to crank the combustion engine so that the combustion engine drives the hydraulic pump.

15. The control device according to claim 12, further configured to perform said activation of the starter in response to a determination that the vehicle travelling speed is below a preselected vehicle speed limit.

16. The control device according to claim 12, further configured to perform said activation of the starter in response to a determination that the combustion engine is disconnected from any drive wheel of the vehicle.

17. The control device according to claim 12, wherein the vehicle further comprises a non-synchronized gearbox, the gearbox configured to selectively transfer driving torque from the combustion engine to drive wheels of the vehicle.

18. The control device according to claim 12, further configured to determine an unintentional shutdown of the combustion engine based on rotational speed of the combustion engine being below a threshold rotational speed while the vehicle is travelling.

19. A vehicle comprising:
a combustion engine;
a starter configured to crank the combustion engine;
a hydraulic power steering system comprising a hydraulic pump configured to be driven by the combustion engine; and
at least one control device wherein the control device is configured to, in response to an indication of need of power steering, activate the starter to crank the combustion engine so that the combustion engine drives the hydraulic pump.

20. The vehicle according to claim 19 further comprising computer program code stored on a non-transitory computer-readable medium, said computer program code comprising computer instructions to cause the at least one control device to perform the operation of, in response to an indication of need of power steering, activating the starter to crank the combustion engine so that the combustion engine drives the hydraulic pump.

* * * * *